Aug. 6, 1935.　　　W. W. ROWAN　　　2,010,467
SEED REMOVING AND PULP COMPRESSING MACHINE FOR FRUITS
Filed June 21, 1933　　　4 Sheets-Sheet 1

Inventor
W. W. Rowan
by Wilkinson & Mawhinney
Attorneys.

Aug. 6, 1935. W. W. ROWAN 2,010,467
SEED REMOVING AND PULP COMPRESSING MACHINE FOR FRUITS
Filed June 21, 1933 4 Sheets-Sheet 3
FIG. 3.
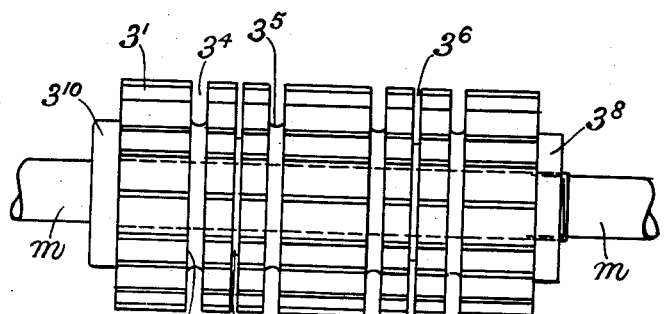
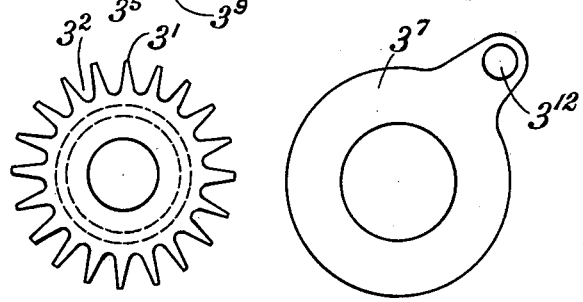
FIG. 4. FIG. 5.
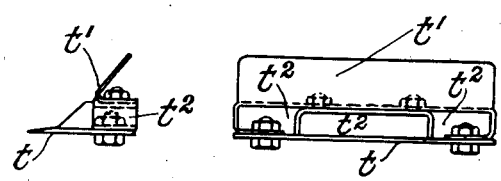
FIG. 6. FIG. 7.
Inventor
W. W. Rowan
by Wilkinson & Mawhinney
Attorneys.

Aug. 6, 1935.   W. W. ROWAN   2,010,467
SEED REMOVING AND PULP COMPRESSING MACHINE FOR FRUITS
Filed June 21, 1933   4 Sheets-Sheet 4

Inventor
William W. Rowan
By Wilkinson & Mawhinney
Attorneys.

Patented Aug. 6, 1935 2,010,467

UNITED STATES PATENT OFFICE 2,010,467

SEED REMOVING AND PULP COMPRESSING MACHINE FOR FRUITS

William Walker Rowan, Elderslie, Scotland

Application June 21, 1933, Serial No. 676,938
In Great Britain June 29, 1932

2 Claims. (Cl. 146—79)

My invention relates to improvements in and connected with machines for removing the rind and seeds from fruit and shredding the rind ready for the manufacture of marmalade and other preserves, and has for its object inter alia the provision of means by which the seeds of the fruit are removed, shredding the rind to any desired thickness, and to simplify and cheapen the construction of the machines by which the fruit is cut into quarters, each quarter being separated from each other, and by which, as the quarters are conveyed forward on suitable conveyor belts, it is capable of so adapting itself that the skin or rind is uppermost and the pulp face down with the sharp point of the fruit fore and aft, suitable rollers being also provided with suitable recesses into which the pulp is pressed, and means for separating the pulp from the rind and shredding the rind to any degree of thickness.

According to this invention, I provide along a conveyor line means for centering and splitting the previously halved fruit into quarters, a seeder-bar against which the quarters are moved by a fluted roller or drum, a knife which severs the rind from the pulp, and interdigitated shredding rollers to which the rind is finally passed.

In order that my invention may be properly understood and readily carried into effect, I have hereunto appended four sheets of drawings, of which Figure 1 is a side elevation with parts broken away illustrating my invention.

Figure 3 is view of one of the rollers.

Figure 4 is end view of section of the roller shown in Figure 3.

Figure 5 is end view of disc supporting seeder-bar.

Figure 6 is an end view of splitting-knife.

Figure 7 is front view of splitting-knife.

Figure 1:
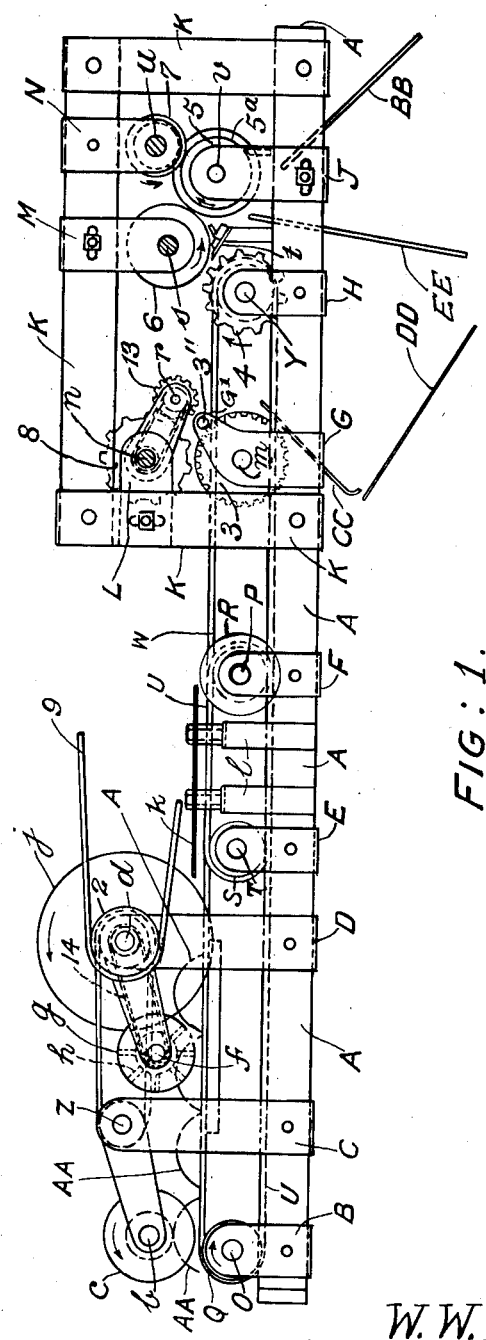
Figure 2:
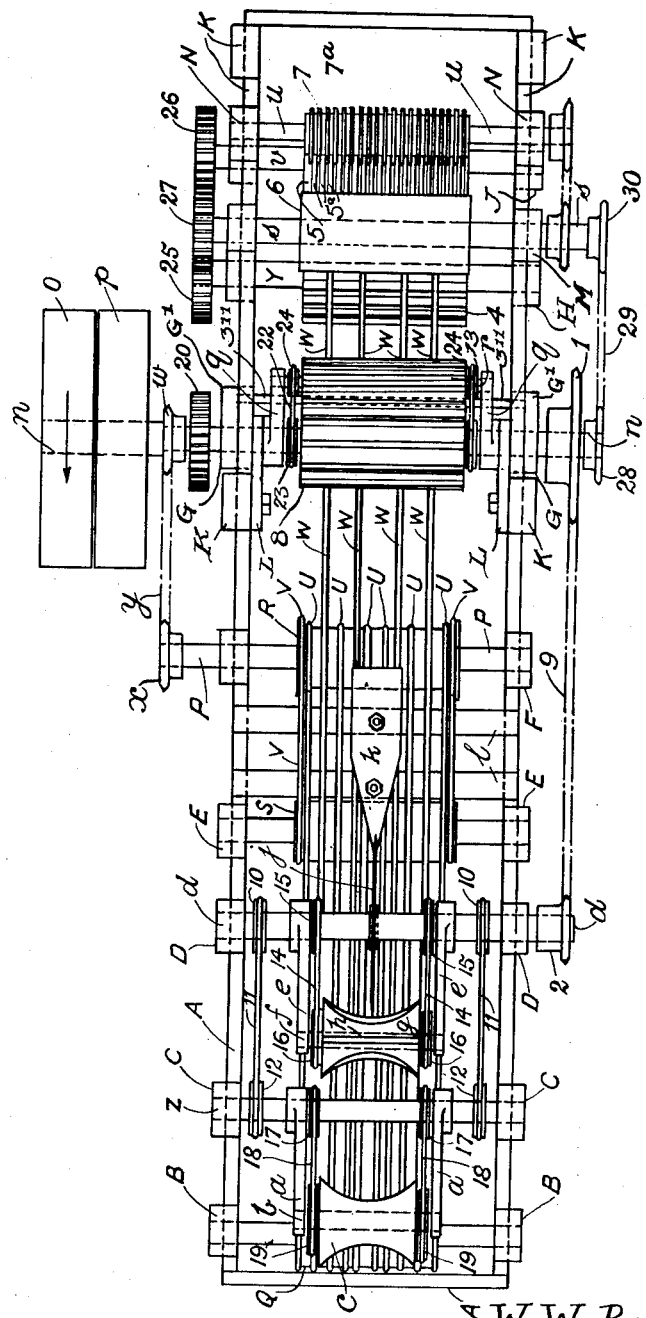
Figure 2 is a plan of Figure 1.
Figure 8:
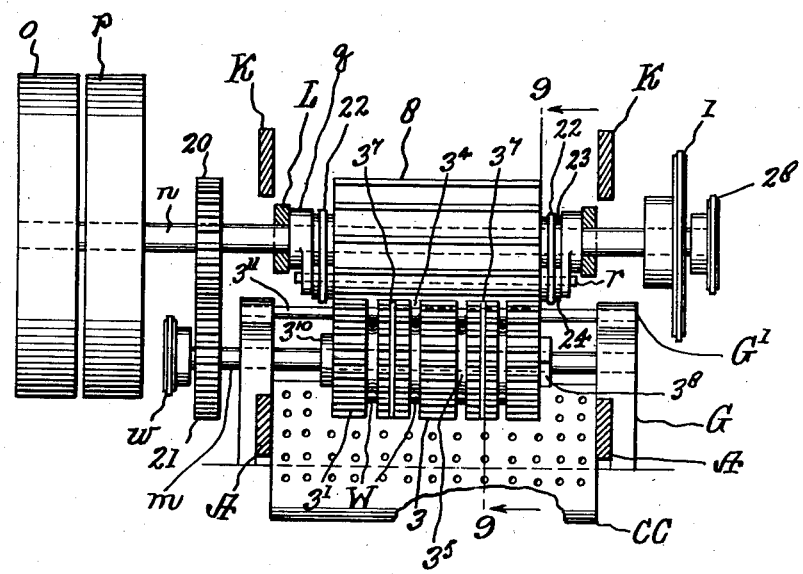
Figure 8 is a transverse section through the machine illustrating the construction of the upper and lower toothed rollers.
Figure 9:
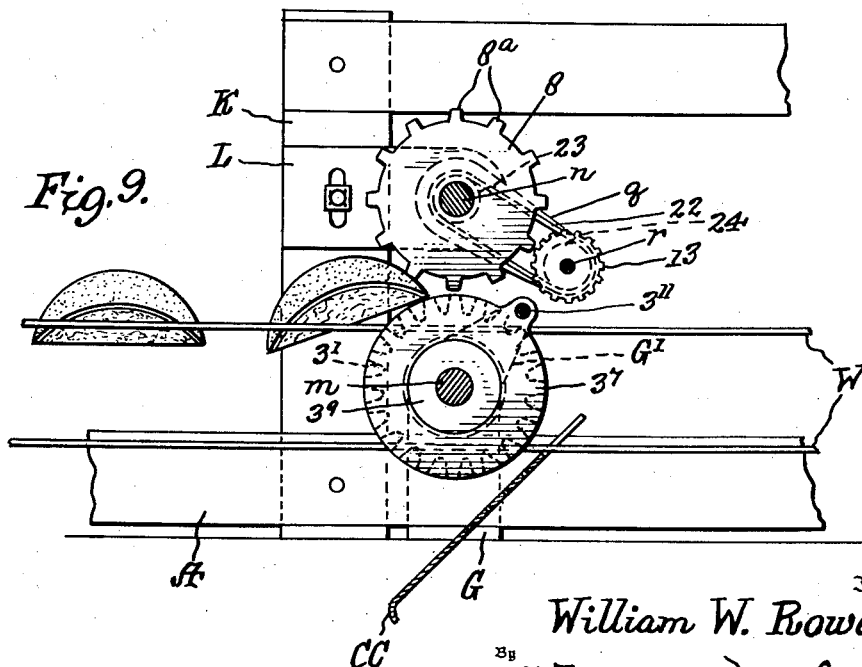
Figure 9 is an enlarged section taken along the line 9—9 of Figure 8 and showing a quarter fruit portion initially contacting with the toothed rollers whereby the skin is held upward.

Referring to the drawings, A is the base-frame having suitably fixed to it on each side thereof bearing-brackets B, C, D, E, F, G, H and J, a frame K being also suitably attached to the base-frame A, the frame K having suitably attached to it bearing brackets L, M and N, the bearing brackets L and M being capable of adjustment on the frame K, and the bearing bracket J being capable of adjustment on the base-frame A. The bearing-brackets B and F having suitably mounted thereon drums Q and R supported upon spindles O and P. Another drum S is mounted on an axle T which is supported by the bracket E. Carried round the drums Q, S and R are six or other suitable number of conveyor belts U, of stretched coiled spring, which engage with suitable grooves or recesses on the drums Q, S and R, the drums S and R having at their extreme ends two spring belts V which also engage with suitable grooves or recesses on the drums S and R. Four additional spring conveyor belts W are also provided and engage with suitable recesses on the drums Q, S, R and roller 4 and also with the recesses formed on the roller 3, the roller 4 being mounted on an axle Y carried on the brackets H.

The bearing-brackets C support a shaft Z on which shaft Z are mounted the ends of each of two levers $a$, the other end of these levers $a$ carrying an axle B on which is mounted a concave roller $c$. On the bearing-brackets D, a shaft $d$ is carried on which there are mounted the ends of each of two levers $e$, an axle $f$ being suitably carried on the other end of the levers $e$. A concave roller $g$ is fixed to the axle $f$, which roller $g$ is provided with longitudinal ribs or projections $h$. A splitting-knife $j$ is suitably fixed to the shaft $d$.

A dividing plate $k$ is suitably positioned above the spring conveyor belts U and W and behind the splitting-knife $j$ and are fixed to two cross-brackets $l$ attached to the base frame A.

The bearing-bracket G carries a shaft $m$ on which is mounted the roller 3. The roller 3 consists of a series of discs $3^1$ having similar recesses $3^2$ formed on the periphery thereof. These discs $3'$ are held spaced apart by a small disc or ring $3^5$ to provide a runway or clearance opening $3^4$ for each of the spring conveyor belts W. A further clearance $3^6$ is provided for the seeder-bar disc $3^7$ by the provision of a smaller disc $3^9$. These discs $3^1$, $3^5$, and $3^9$, are suitably fixed to the shaft $m$ by the nut $3^8$, or otherwise, when the discs are caused to abut against the shoulder $3^{10}$ forming part of the shaft $m$. The seeder-bar consists of a bar $3^{11}$ passing through the hole $3^{12}$ formed on the disc $3^7$, see Figures 3, 4 and 5, the seeder-bar $3^{11}$ being suitably supported at each end on brackets G'. Another roller 8 provided with longitudinal projections $8^a$ inserted in its periphery is carried directly above the roller 3 on a shaft $n$ carried on the supporting brackets L attached to the frame K. The shaft $n$ is the main driving-shaft and has mounted at the end of it a fast and loose pulley o and p respectively. Suitably mounted on this shaft n there is one end of two levers q, the other end of the levers q carrying a shaft r on which is mounted a small roller 13, which roller 13 is provided with suitable projections on its periphery. On the bearing-bracket M which carries the axle s, there is fixed a roller 6, a splitting-knife t, being suitably positioned between the rollers 4 and 6. The splitting-knife t has suitably fixed to it a guiding bracket $t^1$, the surface of the bracket $t^1$ being formed in a curve similar to the curve formed by the periphery of the roller 6. A clearance space $t^3$, according to the thickness of the rind, being provided, see Figure 1, clearance spaces $t^2$ being formed between the brackets $t^1$ and the splitting-knife t to allow any small pieces of pulp to pass underneath the bracket $t^1$, and so ensuring that the rind which passes on top of bracket $t^1$ is delivered free from any loose pieces of pulp, see Figures 6 and 7. Another roller 7 is carried on an axle u, which axle u is mounted on the bearing-bracket N. A roller 5 carried on an axle v is also provided, the axle v being supported on the bearing-bracket J. The roller 7 is built up with alternate large and small discs which produces circumferential grooves $7^a$. The roller 5 consists of a series of cutting discs $5^a$ uniformly spaced by the provision of a suitable number of smaller discs placed between each cutting-disc $5^a$, all being held suitably together on the shaft v, the cutting-discs $5^a$ engaged with the recesses $7^a$ and the roller 7.

The fineness of the shredding may be regulated by varying the thickness of the spacing discs.

The rollers and drums are operated from the main driving fast pulley o fixed to the shaft n through the gears 20 and 21 by means of a sprocket-wheel w fixed to the shaft m and driving another sprocket-wheel x, attached to the shaft P by means of the chain-belt y, the drum R receiving its motion from the shaft P, the drum S in turn receiving its motion through the medium of the spring-belts V. The drum Q also receives its motion from the drum R through the medium of the spring conveyor belts U. Another sprocket wheel I is provided which is fixed to the shaft n and drives a sprocket-wheel 2 through the medium of a chain-belt d, the sprocket-wheel 2 being fixed to the shaft d, which shaft d has fixed to it two pulleys 10, each pulley 10 having a suitable spring-belt 11 engaging with two pulleys 12 attached to the shaft Z. Motion is imparted to the concave drum g through the medium of spring-belts 14, engaging with the pulleys 15 fixed to the shaft d and the pulleys 16 attached to the shaft f, the concave roller c being similarly driven from the shaft Z through the medium of the pulleys 17, belt 18 and pulleys 19.

The rollers 3 and 8 receive their motion through the spur gear-wheels 20 and 21, the spur gear-wheel 20 being fixed to the shaft n and the spur gear-wheel 21 to the shaft m, the roller 13 receiving its motion from the shaft n through the medium of the spring-belts 22 engaging with the pulleys 23 on the shaft n, and the pulley 24 on the shaft r. The rollers 4, 5 and 6 are driven by the spur-wheels 25, 26 and 27, each fixed to the end of the shaft Y, v and s respectively. These rollers 4, 5 and 6 receive their motion from the shaft n through the medium of the sprocket-wheel 28, chain 29 and sprocket-wheel 30, sprocket-wheel 28 being fixed to the shaft n, and the sprocket wheel 30 being fixed to the shaft s.

The mode of operation is as follows:—

The half fruit AA, Figure 1, is placed on the coil spring conveyor belts U and W, and carried to concave roller c which adjusts itself and centralizes the fruit which travels to the concave roller g which supports the fruit AA while being cut in quarters by the cutting-knife j. Each quarter passes to dividing-plate k and are separated from each other at the rear end of dividing-plate k. They are then carried forward on the conveyor belts W into which the quartered fruit so accommodates itself that the rind is uppermost and the pulp down, also the sharp points of the fruit are facing fore and aft, in this position the fruit is conveyed, each quarter being supported by two spring conveyor belts W between rollers 8 and 3, roller 3 having recesses $3^2$ which receive the pulp only, the pulp being pressed into the recesses $3^2$ by roller 8, with the view of breaking up the pulp to facilitate the removal of the seeds therefrom, the distance between said rollers being capable of being adjusted. The fruit which includes the rind and pulp is then carried over the seeder-bar $3^{11}$, the fruit and rind being also assisted over the seeder-bar $3^{11}$ by roller 13. While passing over the seeder-bar $3^{11}$, pressure is put on the top of the rind by the roller 13, so that the rind and the pulp are pressed against the top of the seeder-bar $3^{11}$. This squeezes out the seeds. The seeder-bar discs $3^7$, Figure 5, are stationary, being positioned freely in the recesses or clearances $3^6$, Figure 3, and supported in position by the seeder-bar $3^{11}$ through hole $3^{12}$. The discs $3^7$ guide the fruit over the seeder-bar $3^{11}$. The fruit with rind is still conveyed on the conveyor belts W to between the rollers 4 and 6. Roller 4 is fitted with recesses to receive the pulp which is pressed into them by the roller 6. At the rear of the roller 4 there is fitted a stationary splitting-knife t. This splitting-knife t cuts the pulp from the rind between the roller 6, the thickness of rind being obtained by increasing or decreasing the distance between the rollers 4 and 6. The rind then passes between the rollers 5 and 6, roller 5 cutting the rind into shreds, each shred not being entirely separated owing to the roller 5 being set just clear of the roller 6, the rind being directed by guide-bracket $t^1$, and also assisted by the oncoming rind forcing it on. The shreds are carried round the roller 5 to roller 7, cutting disc $5^a$ engage with the recesses $7^a$ in roller 7, thus dividing each shred, which are carried round roller and discharged upon a plate B—B as shown in Figure 1 to be directed to any suitable receptacle. A suitable grating CC is provided under the seeder-bar $3^{11}$, the seeds falling against the grating CC and the juice passing through the grating CC. The pulp after being separated from the rind is carried round in the recesses upon the plate DD and thence into a container in the rollers 4 and discharged by the conveyor belts W upon plate EE into any suitable container.

I claim:

1. In a fruit handling machine seed removing and pulp compressing means comprising a plurality of spaced traveling endless belts to carry the fruit, a rotatable member mounted below the belts having an outer toothed surface, and provided with runways to direct the passage of the endless belts, a second rotatable member having an outer toothed surface mounted above the belts and lower member and coacting therewith to mash the fruit, a transverse bar supported above the belts and adjacent the lower member, a pair of stationary discs having a diameter substantially equal to the diameter of the lower toothed member supported in runways provided in said lower member and axially therewith, said discs provided with means for engaging said bar to hold the discs against rotation and permit said discs to cooperate with said upper and lower rotatable members to loosen the seeds and soften the fruit pulp, and a rotatable roller supported above said bar and adjacent thereto to coact therewith in removing the seeds and compressing the fruit.

2. A machine for receiving fruit previously cut into half portions comprising a frame, a plurality of traveling endless belts mounted upon said frame in uniformly spaced relation to one another, means for holding said fruit portions upon said endless belts, a knife rotatably supported above the endless belts to cut said half fruit portions into quarter portions, a fixed guide plate centrally located above said endless belts and behind said cutter to direct the movement of the quarter portions lengthwise along the endless belts, a rotatable lower member supported in the frame having an outer toothed surface and provided with runways for the passage of the endless belts, an upper rotatable member supported in the frame and having an outer toothed surface supported to operate above the belts and in close proximity to said lower member, a transverse bar supported in said frame adjacent the lower member, a fixed disc having a diameter substantially equal to the lower toothed member mounted coaxially in the lower member between a pair of belts, said disc having means for holding it with the bar against rotation whereby said discs co-act with said members to soften the pulp and loosen the seeds from the fruit portions, a rotatable roller supported above the fixed bar and adjacent thereto to coact therewith in removing the seeds by compressing the fruit portions and leading the same forwardly on to the endless belts, means for slicing said pulp and skin, and means for shredding said skin.

WILLIAM WALKER ROWAN.